US009635151B2

(12) United States Patent
Shimomura et al.

(10) Patent No.: US 9,635,151 B2
(45) Date of Patent: Apr. 25, 2017

(54) IN-VEHICLE COMMUNICATION SYSTEM AND IN-VEHICLE RELAY APPARATUS

(71) Applicants: AUTONETWORKS TECHNOLOGIES, LTD, Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Yoshikuni Shimomura, Yokkaichi (JP); Hiroshi Okada, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 20 days.

(21) Appl. No.: 14/227,198

(22) Filed: Mar. 27, 2014

(65) Prior Publication Data

US 2014/0297109 A1    Oct. 2, 2014

(30) Foreign Application Priority Data

Mar. 28, 2013  (JP) ................. 2013-070220

(51) Int. Cl.
*H04L 29/14* (2006.01)
*H04L 29/08* (2006.01)
*H04L 29/06* (2006.01)

(52) U.S. Cl.
CPC ............ *H04L 69/40* (2013.01); *H04L 67/125* (2013.01); *H04L 63/12* (2013.01)

(58) Field of Classification Search
CPC ..... H04L 2012/40273; H04L 29/12849; H04L 69/40; H04L 63/12; H04L 67/125; H04B 7/14; B60R 16/00–16/0231
(Continued)

(56) References Cited

U.S. PATENT DOCUMENTS 9,036,509 B1 * 5/2015 Addepalli et al. ............ 370/259
2002/0007238 A1 * 1/2002 Moriguchi et al. ............. 701/36
(Continued)

FOREIGN PATENT DOCUMENTS

JP     A-2012-009941      1/2012
WO    WO 2013051122 A1 *  4/2013

*Primary Examiner* — Courtney Heinle
(74) *Attorney, Agent, or Firm* — Oliff PLC

(57) ABSTRACT

An in-vehicle communication system and an in-vehicle relay apparatus that can perform relaying between multiple in-vehicle networks if a new in-vehicle device is connected to a said in-vehicle network, and that can prevent, if an improper in-vehicle device is connected to the in-vehicle network, the entire system from being adversely affected by the improper in-vehicle device. The in-vehicle relay apparatus that relays information between the multiple in-vehicle networks has stored therein relay destination determination information necessary to determine a relay destination of information. If a new in-vehicle device is connected to any one of the in-vehicle networks, an acquiring unit communicates with a communication device to obtain updated relay destination determination information, a determination unit determines if the updated relay destination determination information is legitimate, and an updating unit updates the relay destination determination information of the in-vehicle relay apparatus.

14 Claims, 8 Drawing Sheets

(58) Field of Classification Search
USPC .......................................................... 701/36
See application file for complete search history.

(56) References Cited

U.S. PATENT DOCUMENTS

| | | | |
|---|---|---|---|
| 2003/0120396 A1* | 6/2003 | Vollmer et al. .................... | 701/1 |
| 2003/0167112 A1* | 9/2003 | Akiyama ......................... | 701/36 |
| 2007/0133578 A1* | 6/2007 | Tani ............................... | 370/401 |
| 2010/0042290 A1* | 2/2010 | Isoyama ......................... | 701/35 |
| 2010/0215043 A1* | 8/2010 | Hisada ........................... | 370/392 |
| 2010/0329272 A1* | 12/2010 | Tsuboi et al. .................. | 370/401 |
| 2011/0029644 A1* | 2/2011 | Gelvin et al. .................. | 709/220 |
| 2011/0093136 A1* | 4/2011 | Moinzadeh et al. ............. | 701/2 |
| 2011/0153149 A1* | 6/2011 | Jeon et al. ...................... | 701/32 |
| 2012/0116633 A1* | 5/2012 | Kato et al. ...................... | 701/36 |
| 2012/0307836 A1* | 12/2012 | Ishigooka et al. ............ | 370/401 |
| 2013/0031212 A1* | 1/2013 | Enosaki et al. ............... | 709/218 |
| 2013/0185766 A1* | 7/2013 | Fujiki et al. ...................... | 726/3 |
| 2013/0212221 A1* | 8/2013 | Yamane et al. ............... | 709/217 |
| 2014/0067157 A1* | 3/2014 | Hanai et al. ...................... | 701/1 |
| 2014/0114497 A1* | 4/2014 | Miyake ............................ | 701/1 |
| 2014/0154971 A1* | 6/2014 | Tanaka ............................. | 455/7 |
| 2014/0247122 A1* | 9/2014 | Moeller et al. .......... | 340/426.25 |
| 2014/0297110 A1* | 10/2014 | Noda et al. ..................... | 701/36 |
| 2014/0337829 A1* | 11/2014 | Ito ................................. | 717/175 |
| 2014/0351460 A1* | 11/2014 | Tsuboi et al. ................... | 710/36 |

\* cited by examiner

ROUTING MAP

| INFORMATION ID | NETWORK ID |
|---|---|
| 51 | NW2, NW3 |
| 52 | NW3 |
| 53 | NW2 |
| ⋮ | ⋮ |
| 57 | NW1, NW2 |

FIG. 4

IN-VEHICLE COMMUNICATION SYSTEM AND IN-VEHICLE RELAY APPARATUS

BACKGROUND

The present disclosure relates to an in-vehicle communication system in which a plurality of in-vehicle devices, which are installed in a vehicle, communicate with one another and to an in-vehicle relay apparatus for use in this system.

Conventionally, due to an increase in the number of in-vehicle devices installed in a vehicle, in-vehicle networks for transmitting and receiving information between the in-vehicle devices are becoming larger. Accordingly, in-vehicle networks are divided into multiple in-vehicle networks, and an in-vehicle relay apparatus, such as a gateway, is used so as to relay transmission and reception of information between the multiple in-vehicle networks.

For example, JP 2012-9941A discloses an in-vehicle gateway apparatus that connects a multimedia ECU (Electronic Control Unit) for controlling an in-vehicle multimedia device to a plurality of vehicle ECUs for controlling the vehicle. The in-vehicle gateway apparatus includes a storage area in which multiple pieces of vehicle-related data acquired by the vehicle ECUs are stored, and an information acquiring unit that updates the vehicle-related data stored in the storage area on a regular basis. The multimedia ECU accesses the in-vehicle gateway apparatus, and acquires the vehicle-related data stored in the storage area.

JP 2012-9941A is an example of related art.

BRIEF SUMMARY

The in-vehicle gateway apparatus disclosed in JP 2012-9941A updates data stored in the storage area with data from the vehicle ECUs, but cannot determine whether or not the data from the vehicle ECUs is correct. For example, in a case where a new vehicle ECU is added to an in-vehicle network, data from the added vehicle ECU is not always correct. If the added vehicle ECU is defective, malicious, or the like, updating of the data in the storage area with the data from this vehicle ECU may adversely affect the entire system.

The present device, and variations thereof, was made in view of such circumstances, and it is an object of the present disclosure to provide an in-vehicle communication system and an in-vehicle relay apparatus that can appropriately perform relaying between a plurality of in-vehicle networks when, for example, a new in-vehicle device is added to an in-vehicle network, and can suppress the entire system from being adversely affected when an improper in-vehicle device is connected thereto.

An in-vehicle communication system according to one aspect of the present disclosure is directed to an in-vehicle communication system that comprises a plurality of in-vehicle networks respectively connected to at least one in-vehicle device; and an in-vehicle relay apparatus that is connected to the plurality of in-vehicle networks and that relays information between the in-vehicle networks, the in-vehicle relay apparatus comprising: a storage unit that stores relay destination determination information that is necessary to determine a destination of information to be relayed by the in-vehicle relay apparatus, and a relay destination determination unit that determines, based on the relay destination determination information stored in the storage unit, another said in-vehicle network to which received information is to be transmitted if the received information is received from one said in-vehicle network, the in-vehicle communication system further comprising: a vehicle external communication unit that transmits and receives information to and from a communication device outside of a vehicle; an acquiring unit that acquires, using the vehicle external communication unit, updated relay destination determination information from the communication device outside of the vehicle; a determination unit that determines if the updated relay destination determination information acquired by the acquiring unit satisfies a predetermined condition; and an update unit that updates the relay destination determination information stored in the storage unit of the in-vehicle relay apparatus with the updated relay destination determination information if the determination unit has determined that the updated relay destination determination information satisfies the predetermined condition.

Furthermore, the in-vehicle communication system according to another aspect of the present disclosure is such that the in-vehicle relay apparatus comprises a notification unit that gives out a notification if there is no said in-vehicle network to which the received information is to be relayed.

Furthermore, the in-vehicle communication system according to another aspect of the present disclosure is such that each of the in-vehicle devices connected to the in-vehicle networks comprises: a storage unit that stores reception determination information that is necessary to determine if information is to be received; a reception determination unit that determines, based on the reception determination information stored in the storage unit, if information transmitted from the in-vehicle relay apparatus is to be received; and a restriction unit that puts a restriction to prevent processing using the information transmitted from the in-vehicle relay apparatus if the reception determination unit has determined that the information transmitted from the in-vehicle relay apparatus is not to be received, and wherein the in-vehicle communication system comprises: an acquiring unit that acquires, using the vehicle external communication unit, updated reception determination information for each of the in-vehicle devices from the communication device outside of the vehicle; a determination unit that determines if the updated reception determination information acquired by the acquiring unit satisfies a predetermined condition; and an update unit that updates the reception determination information stored in the storage unit of each of the in-vehicle devices with the updated reception determination information if the determination unit has determined that the updated reception determination information satisfies the predetermined condition.

Furthermore, the in-vehicle communication system according to another aspect of the present disclosure includes an information updating apparatus that includes the vehicle external communication unit, the acquiring unit, and the determination unit, wherein the update unit is configured to update the relay destination determination information stored in the storage unit of the in-vehicle relay apparatus with information provided from the information updating apparatus.

Furthermore, the in-vehicle communication system according to another aspect of the present disclosure is such that the in-vehicle relay apparatus comprises: a plurality of vehicle internal communication units that respectively transmit and receive information to and from the plurality of in-vehicle networks; and an update communication unit that transmits and receives information to and from the information updating apparatus, and wherein reception of information used to update the relay destination determination information stored in the storage unit is restricted to the update communication unit.

Furthermore, the in-vehicle communication system according to another aspect of the present disclosure is such that the determination unit is configured to determine, as the predetermined condition, if the information acquired by the acquiring unit is legitimate information based on (1) a result of authentication processing performed with the communication device outside of the vehicle, or (2) digital signature information added to the information acquired by the acquiring unit.

Furthermore, an in-vehicle relay apparatus according to another aspect of the present disclosure is directed to an in-vehicle relay apparatus that is connected to a plurality of in-vehicle networks respectively connected to at least one in-vehicle device and that relays information between the in-vehicle networks, the in-vehicle relay apparatus comprising: a storage unit that stores relay destination determination information that is necessary to determine a destination of information to be relayed by the in-vehicle relay apparatus; a relay destination determination unit that determines, based on the relay destination determination information stored in the storage unit, another said in-vehicle network to which received information is to be transmitted if the received information is received from one said in-vehicle network; a vehicle external communication unit that transmits and receives information to and from a communication device outside of a vehicle; an acquiring unit that acquires, using the vehicle external communication unit, updated relay destination determination information from the communication device outside of the vehicle; a determination unit that determines if the updated relay destination determination information acquired by the acquiring unit satisfies a predetermined condition; and an update unit that updates the relay destination determination information stored in the storage unit of the in-vehicle relay apparatus with the updated relay destination determination information if the determination unit has determined that the updated relay destination determination information satisfies the predetermined condition.

According to one aspect of the present disclosure, the in-vehicle relay apparatus that relays information between the plurality of in-vehicle networks has stored therein relay destination determination information that is necessary for determining a relay destination of the information. The relay destination determination information may be a table or the like in which, for example, an identifier (ID) or the like included in information to be transmitted and received between the in-vehicle networks is associated with an identifier given to an in-vehicle network to which the information is to be relayed, and is a so-called routing map of a gateway device. The in-vehicle relay apparatus performs processing for relaying information between the in-vehicle networks based on the stored relay destination determination information.

If a new in-vehicle device is connected to an in-vehicle network, it is necessary to update the relay destination determination information stored in the in-vehicle relay apparatus in order to determine to which of the in-vehicle networks the information transmitted by this in-vehicle device is to be relayed. The present system acquires new relay destination determination information by communicating with a server device or the like that is outside of the vehicle, determines whether or not the acquired relay destination determination information is information satisfying a predetermined condition, and then updates the relay destination determination information stored in the in-vehicle relay apparatus. For example, it is possible to determine whether or not the acquired information is legitimate information, based on success or failure of authentication processing with the server device or the like that is outside of the vehicle, digital signature information included in the acquired relay destination determination information, or the like.

Accordingly, it is possible to make the update of the relay destination determination information of the in-vehicle relay apparatus difficult if an improper in-vehicle device is connected to any one of the in-vehicle networks. Therefore, it is possible to prevent the connection of an improper in-vehicle device from adversely affecting in-vehicle networks other than the in-vehicle network to which this in-vehicle device is connected.

Furthermore, according to another aspect of the present disclosure, if, as a result of the relay destination determination based on the relay destination determination information that was performed by the in-vehicle relay apparatus, there is no destination to which the received information is to be relayed, the in-vehicle relay apparatus gives a notification. Accordingly, it is possible to notify the owner, etc. of the vehicle of the connection of the improper in-vehicle device.

Furthermore, according to another aspect of the present disclosure, with respect to information to be transmitted and received in in-vehicle networks, each in-vehicle device has stored therein reception determination information, which is necessary for determining whether or not to receive that information. The reception determination information is, for example, a list of IDs given to information to be received. Each in-vehicle device receives information that was determined as information to be received based on the reception determination information, but does not receive other information.

Since, if a new in-vehicle device is connected to an in-vehicle network, each in-vehicle device determines whether or not to receive information transmitted by the new in-vehicle device, the reception determination information stored in the in-vehicle device needs to be updated. Similarly to the case of the relay destination determination information, the present system acquires new reception determination information by communicating with the server device or the like that is outside of the vehicle, determines whether or not the acquired reception determination information is legitimate information, and then updates the reception determination information stored in each in-vehicle apparatus.

Accordingly, even if an improper in-vehicle device is connected to an in-vehicle network, it is possible to prevent another in-vehicle device from receiving and processing information transmitted by the improper in-vehicle device.

Furthermore, according to another aspect of the present disclosure, the system includes an information updating apparatus that acquires necessary information from an external server device or the like, and determines whether or not the acquired information is legitimate information, in order to performing the above-described information update. The in-vehicle relay apparatus communicates with the information updating apparatus, and performs the update with the information provided by the information updating apparatus.

Furthermore, according to another aspect of the present disclosure, the in-vehicle relay apparatus includes the plurality of vehicle internal communication units that respectively transmit and receive information to and from the in-vehicle networks, and the update communication unit that transmits and receives information to and from the information updating apparatus. The in-vehicle relay apparatus performs update processing using the information received by the update communication unit, and is restricted so as not to perform the update processing if update information is received from any one of the vehicle internal communication units. It is thus possible to prevent an apparatus other than the information updating apparatus from improperly updating the information of the in-vehicle relay apparatus.

Furthermore, in one aspect, the present device may have a configuration in which the in-vehicle relay apparatus acquires necessary information from the external server device or the like, and performs processing necessary for updating information, such as determination of whether or not the acquired information is legitimate information.

According to another aspect of the present disclosure, the in-vehicle relay apparatus has stored therein relay destination determination information, and performs information relay processing. The information relay processing can be appropriately performed, since the in-vehicle relay apparatus is configured, if a new in-vehicle device is connected for example, to perform updating of the relay destination determination information by acquiring relay destination determination information from an external device. Furthermore, since it is configured such that an update is only performed if the relay destination determination information acquired from the external device is information satisfying a predetermined condition, the update of the relay destination determination information can be made difficult, thus making it possible to prevent connection of an improper in-vehicle device from adversely affecting the entire system.

BRIEF DESCRIPTION OF THE DRAWINGS

FIG. 4 is a schematic diagram illustrating an example of a routing map.

DETAILED DESCRIPTION

Embodiment 1

Figure 1:
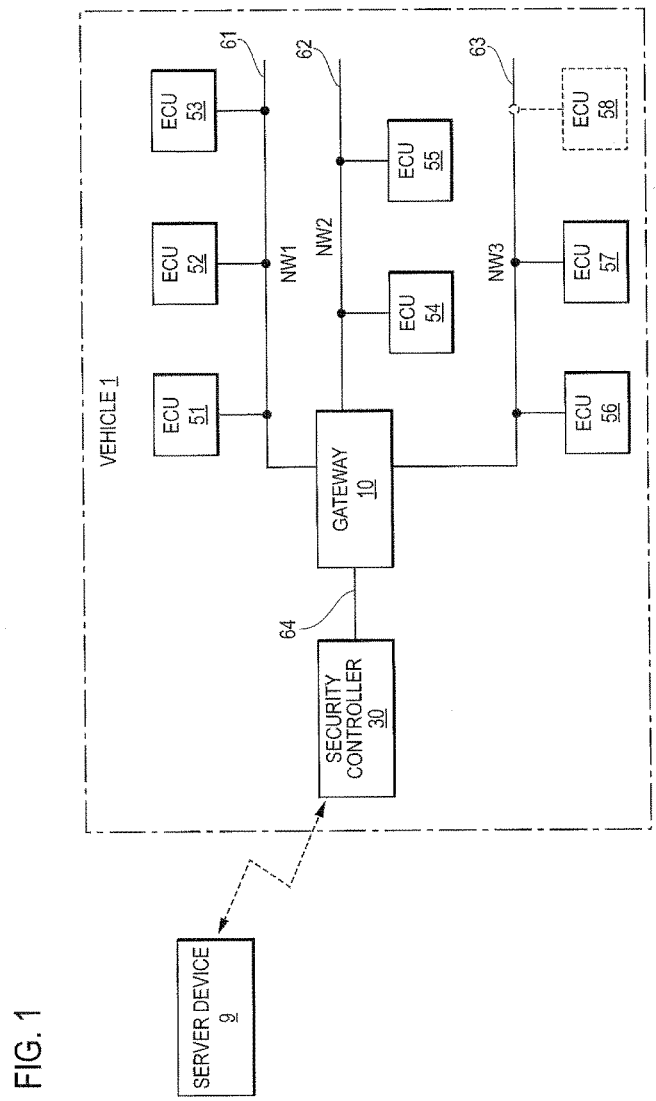
FIG. 1 is a schematic diagram illustrating a configuration of an in-vehicle communication system according to an embodiment.

Hereinafter, various embodiments will specifically be described with reference to the drawings. FIG. 1 is a schematic diagram illustrating a configuration of an in-vehicle communication system according to the present embodiment. In the drawing, the reference numeral 1 indicated by the alternate long and short dash line denotes a vehicle, and the vehicle 1 includes a plurality of in-vehicle devices. Although in the present embodiment, the in-vehicle devices are referred to as ECUs 51, 52 etc., the in-vehicle devices may also include devices other than the ECUs. These ECUs 51, 52 etc. are connected to communication lines provided in the vehicle 1, and by the ECUs 51, 52 etc. communicating with one another to exchange information, various types of processing, such as cruise control of the vehicle 1, are realized.

In the present embodiment, the in-vehicle networks of the vehicle 1 are divided into three in-vehicle networks. In-vehicle network NW1 refers to a network in which three ECUs 51 to 53 are connected to a common communication line 61. In-vehicle network NW2 refers to a network in which two ECUs 54 and 55 are connected to a common communication line 62. In-vehicle network NW3 refers to a network in which two ECUs 56 and 57 are connected to a common communication line 63. Note that, in the drawing, the ECU 58 indicated by the dashed line is an ECU to be newly added to the in-vehicle network NW3, as will be described in detail later. The communication lines 61 to 63 are connected to a gateway 10.

The gateway 10 is an apparatus that performs processing for relaying transmission and reception of information between the multiple in-vehicle networks NW1 to NW3 provided in the vehicle 1. If, for example, the ECU 51 in the in-vehicle network NW1 transmits information, the gateway 10 receives this information and transmits the received information to the in-vehicle network NW2 and/or NW3, as needed. Accordingly, by interposing the gateway 10, it is possible to transmit and receive information between the ECUs 51, 52 etc. that are connected to the different in-vehicle networks NW1 to NW3.

The in-vehicle communication system according to the present embodiment also includes a security controller 30. The security controller 30 is connected to the gateway 10 via a communication line 64. The security controller 30 is capable of transmitting and receiving information to and from, for example, a server device 9 or the like that is located outside of the vehicle 1 by wireless communication. The security controller 30 transmits information to the outside of the vehicle 1 in response to a request from the gateway 10, and provides information received from the outside of the vehicle 1 to the gateway 10. At that time, the security controller 30 performs authentication processing with the external server device 9 or the like, processing for determining as to whether or not the received information is legitimate information, and other processing. With this, the gateway 10 and the ECUs 51, 52 etc. that are installed in the vehicle 1 can transmit and receive information to and from the external server device 9 via the security controller 30.

Figure 2:
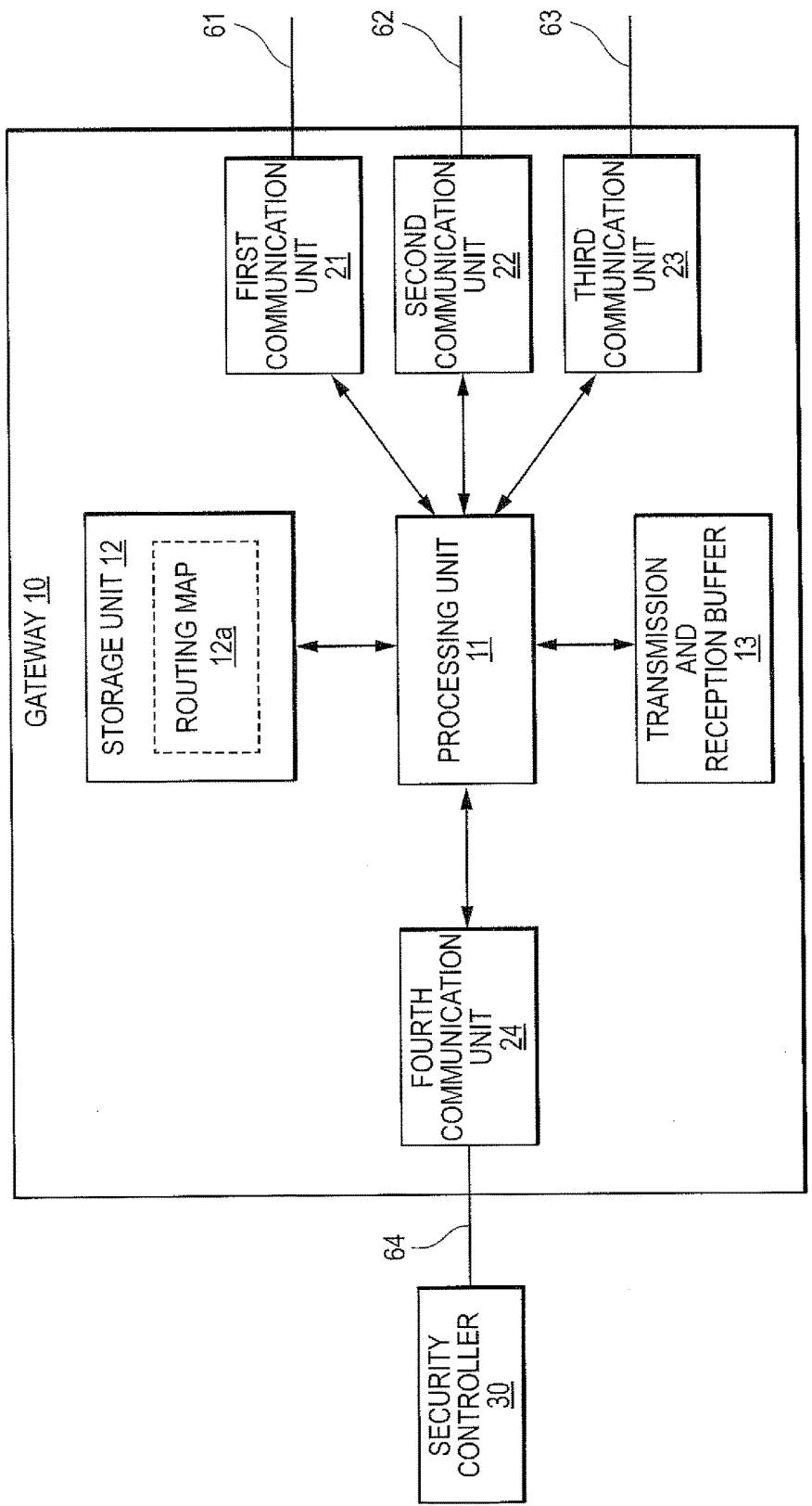
FIG. 2 is a block diagram illustrating a configuration of a gateway.

FIG. 2 is a block diagram illustrating a configuration of the gateway 10. The gateway 10 includes a processing unit 11, a storage unit 12, a transmission and reception buffer 13, first to fourth communication units 21 to 24, for example. The processing unit 11 is constituted by an arithmetic processing unit such as a central processing unit (CPU) or a micro processing unit (MPU), and performs various types of processing, such as information relay processing, by reading a program stored in the storage unit 12, a read only memory (ROM) (not shown), or the like and executing the read program. The storage unit 12 is constituted by a data rewritable non-volatile memory element such as an electrically erasable programmable ROM (EEPROM) or a flash memory. The storage unit 12 has stored therein a routing map 12a for use in the relay processing of the processing unit 11. The transmission and reception buffer 13 is constituted by a memory element such as a dynamic random access memory (DRAM) or a static random access memory (SRAM), and temporarily stores information to be relayed.

The first communication unit 21 is connected to the communication line 61 of the in-vehicle network NW1, and performs information transmission and reception complying with, for example, the Controller Area Network (CAN) communication standard. The first communication unit 21 receives information transmitted by the ECUs 51 to 53 of the in-vehicle network NW1 by monitoring a signal on the communication line 61, and provides the received information to the processing unit 11. Also, the first communication unit 21 transmits information for transmission that was provided by the processing unit 11 to the ECUs 51 to 53 of the in-vehicle network NW1 by outputting the information to the communication line 61 as a signal.

Similarly, the second communication unit 22 is connected to the communication line 62 of the in-vehicle network NW2, and performs transmission and reception of information to and from the ECUs 54 and 55 of the in-vehicle network NW2. The third communication unit 23 is connected to the communication line 63 of the in-vehicle network NW3, and performs transmission and reception of information to and from the ECUs 56 and 57 of the in-vehicle network NW3.

The fourth communication unit 24 may have substantially the same configuration as those of the first to third communication units 21 to 23, but is treated as a communication unit dedicated to communicating with the security controller 30. The fourth communication unit 24 is connected to the security controller 30 via the communication line 64. The fourth communication unit 24 transmits information provided from the processing unit 11 to the security controller 30, receives information from the security controller 30, and provides the received information to the processing unit 11. Note that, in the present embodiment, the first to fourth communication units 21 to 24 are assumed to perform communication complying with the CAN communication standard, but also may perform communication complying with different communication standards. Specifically, the fourth communication unit 24 may adopt a communication standard exclusively for use in communication with the security controller 30.

Figure 3:
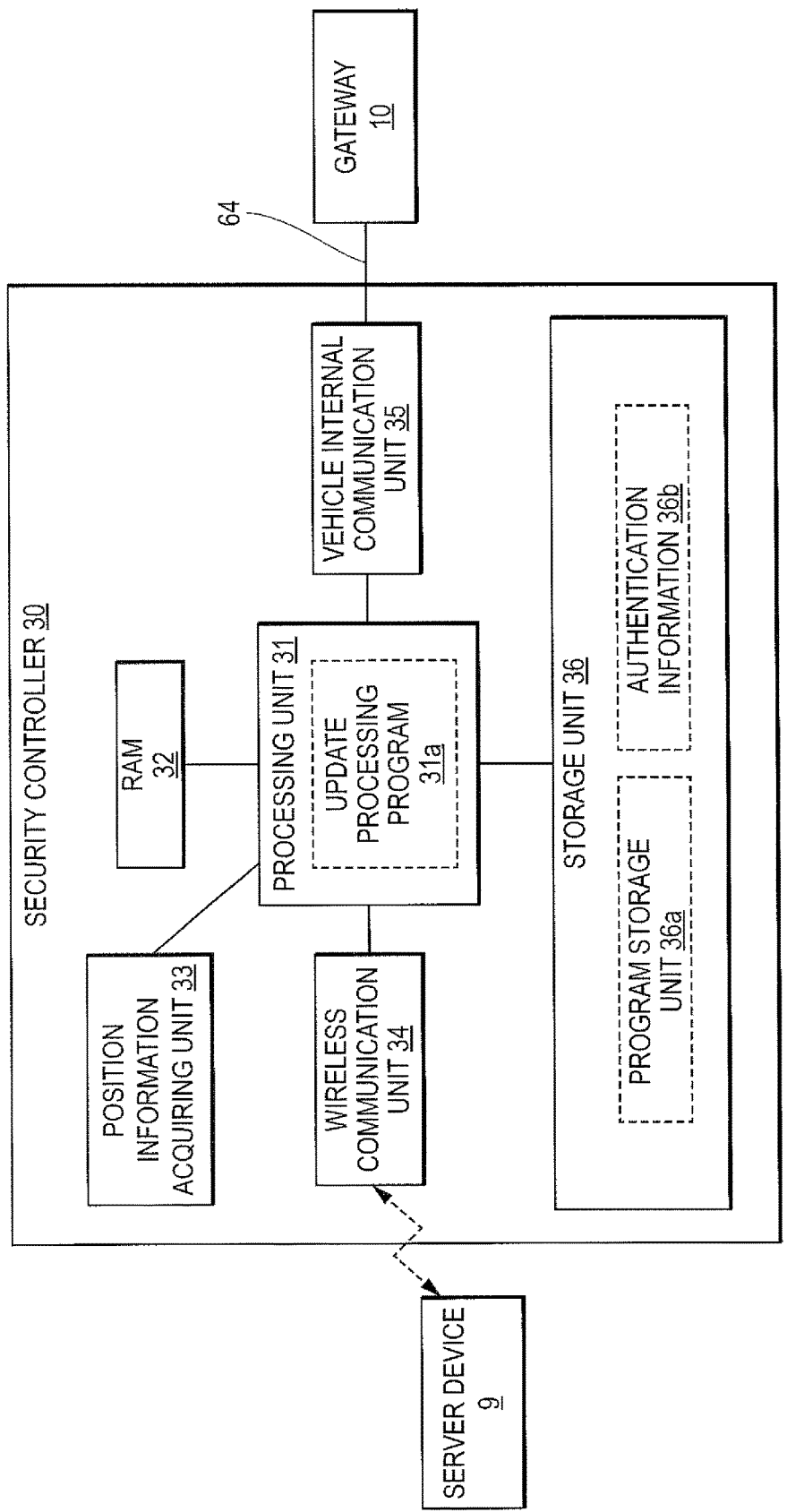
FIG. 3 is a block diagram illustrating a configuration of a security controller.

FIG. 3 is a block diagram illustrating a configuration of the security controller 30. The security controller 30 includes a processing unit 31, a RAM 32, a position information acquiring unit 33, a wireless communication unit 34, a vehicle internal communication unit 35, and a storage unit 36, for example. The processing unit 31 is an arithmetic processing unit that performs various types of processing by reading one or more programs stored in a program storage unit 36a of the storage unit 36 onto the RAM 32, and executing the read program. In the shown example, the processing unit 31 executes an update processing program 31a. The RAM 32 is constituted by a memory element, such as a SRAM or a DRAM, and temporarily stores the program executed by the processing unit 31, data needed for the execution, and the like.

The position information acquiring unit 33 acquires position information of the vehicle 1, and provides the acquired information to the processing unit 31. The position information acquiring unit 33, to which an antenna or the like for receiving a signal of, for example, a Global Positioning System (GPS) is connected, may be configured to calculate the position of the vehicle 1 (such as latitude and longitude) based on the received signal. Furthermore, the position information acquiring unit 33 may calculate the position of the vehicle 1 with the use of information obtained from a sensor, such as a speed sensor, an acceleration sensor, or a gyro sensor and map information, or the like. If a car navigation device is installed in the vehicle 1, a configuration is also possible in which the car navigation device performs processing for calculating the position of the vehicle 1, and the security controller 30 obtains and uses the calculation result.

The wireless communication unit 34 communicates for example with the server device 9 that is disposed remotely from the vehicle 1 with the use of, for example, a public mobile telephone network, a wireless LAN (Local Area Network) or the like. The wireless communication unit 34 transmits information provided from the processing unit 31 to an external device, such as the server device 9, and provides information received from the external device to the processing unit 31. The vehicle internal communication unit 35 is connected to the gateway 10 installed in the vehicle 1 via the communication line 64. The vehicle internal communication unit 35 transmits information provided from the processing unit 31 to the gateway 10, and provides information received from the gateway 10 to the processing unit 31.

The storage unit 36 is constituted by a non-volatile memory element such as a flash memory or EEPROM, a magnetic storage device such as a hard disk, or the like. The storage unit 36 includes a program storage unit 36a in which a program to be executed by the processing unit 31, data needed for the execution, and the like are stored. The storage unit 36 also stored authentication information 36b for use in authentication processing with the server device 9.

FIG. 4 is a schematic diagram illustrating an example of the routing map 12a. The routing map 12a that the gateway 10 has stored in the storage unit 12 is information necessary for determining a relay destination. In the present embodiment, IDs are respectively added to information to be transmitted and received in the in-vehicle networks NW1 to NW3. In the routing map 12a, an ID added to information to be relayed is stored in association with information for identifying at least one of the in-vehicle networks NW1 to NW3 that serves as a relay destination. For ease of illustration, it is assumed that, for example, ID "51" is given to information to be transmitted from the ECU 51, ID "52" is given to information to be transmitted from the ECU 52, . . . , and ID "57" is given to information to be transmitted from the ECU 57. It is also assumed that IDs "NW1" to "NW3" are respectively given to the in-vehicle networks NW1 to NW3. The routing map 12a shown in FIG. 4 is set such that information with the ID "51" is to be relayed to the in-vehicle networks NW2 and NW3, and information with the ID "52" is to be relayed to the in-vehicle network NW3. It is preferable that just the right number of IDs given to information to be transmitted and received in the vehicle 1 is registered in routing map 12a.

If information has been received with any one of the first to third communication units 21 to 23, the processing unit 11 of the gateway 10 checks the ID given to the received information. The processing unit 11 refers to the routing map 12a stored in the storage unit 12, and decides which of the in-vehicle networks NW1 to NW3 the information is to be relayed to in accordance with the ID of the received information. The processing unit 11 provides the information to the first to third communication units 21 to 23 that correspond to the determined relay destination, and transmits the information to the corresponding in-vehicle networks NW1 to NW3.

Note that, although not shown in FIG. 4, if the ECUs 51 to 57 installed in the vehicle 1 are configured to be able to communicate with the server device 9 outside of the vehicle, information on this is also set in the routing map 12a. For example, if the ID "151" is given to information that the ECU 51 transmits to the outside of the vehicle, and the ID "NW4" is given to the in-vehicle network to which the security controller 30 is connected, it is set in the routing map 12a that the in-vehicle network ID "NW4" is associated with the information ID "151". If the processing unit 11 of the gateway 10 has received the information with ID "151", the processing unit 11 provides this information to the fourth communication unit 24 and thus lets the fourth communication unit 24 transmit the information to the security controller 30.

If the processing unit 11 of the gateway 10 has received information with an ID that is not registered in the routing map 12a, the processing unit 11 gives a notification outward. If the processing unit 11 has received information with an unregistered ID, the processing unit 11 lets the fourth communication unit 24 transmit a notification request to the security controller 30 and thus to an external device. That is, the security controller 30 that has received this information gives a notification to the external device using the wireless communication unit 34. The external device that has received the notification from the security controller 30 can notify, for example, the dealer of the vehicle 1 or the owner of the vehicle 1, or the like. Therefore, the in-vehicle relay apparatus 10 can detect, for example, a situation in which an in-vehicle device that transmits information with an unregistered ID is connected to any one of the in-vehicle networks NW1 to NW3, a situation in which any one of the ECUs 51 to 57 is transmitting irregular information due to a transmission failure or the like, and can give out a corresponding notification.

Next, it is discussed how to add a new ECU 58 to the in-vehicle network NW3. It is assumed that the ID "58" is given to information to be transmitted by this ECU 58. If the ECU 58 is simply connected to the communication line of the in-vehicle network NW3 and the system is operated, the information transmitted by the ECU 58 is received by the gateway 10. Since the ID "58" of the received information is not registered in the routing map 12a and there is no in-vehicle network to which this information is to be relayed, the processing unit 11 of the gateway 10 gives out the above-described notification. Accordingly, if the new ECU 58 is added, the routing map 12a stored in the storage unit 12 of the gateway 10 needs to be updated.

An operator who has undertaken the task of adding the ECU 58 to the in-vehicle network NW3 gives an instruction to update the routing map 12a to the gateway 10, using, for example, an operation unit arranged in the gateway 10, an operation device that is connected to the gateway 10 via a dedicated line etc., or the like. The processing unit 11 of the gateway 10 that has received this update instruction requests the security controller 30 to acquire a new routing map 12a. In response to the request from the gateway 10, the processing unit 31 of the security controller 30 performs processing for updating the routing map 12a by reading the update processing program 31a from the storage unit 36a of the storage unit 36 and executing the read update processing program.

The processing unit 31 of the security controller 30 starts communicating, using the wireless communication unit 34, with the server device 9 that will provide a routing map 12a. The processing unit 31 first performs authentication processing with the server device 9 using the authentication information 36b stored in the storage unit 36. The authentication information 36b includes, for example, identification information and a password of the owner of the vehicle 1, key information for use in encryption of the information transmission, and the like. If the authentication processing with the server device 9 was successful, the processing unit 31 requests the server device 9 to transmit a new routing map 12a. At that time, the processing unit 31 may acquire information on the old routing map 12a and the newly added in-vehicle device, and the like from the gateway 10, and transmit the obtained information to the server device 9.

In response to the request from the security controller 30, the server device 9 transmits an appropriate routing map 12a to the source that has transmitted this request. At that time, the server device 9 may create a new routing map 12a based on the information provided together with the request from the security controller 30 and transmit the created routing map 12a, or may select an appropriate one from the routing maps 12a stored in advance and transmit the selected routing map 12a.

The processing unit 31 of the security controller 30 that has received the routing map 12a from the server device 9 using the wireless communication unit 34 decrypts the encrypted routing map 12a using the key information included in the authentication information 36b, and determines whether or not this routing map 12a is a legitimate one based on information added to the routing map 12a, such as a digital signature. If it is determined that the routing map 12a is a legitimate one, the processing unit 31 lets the vehicle internal communication unit 35 transmit the routing map 12a to the gateway 10.

The processing unit 11 of the gateway 10 that has received the routing map 12a from the security controller 30 at the fourth communication unit 24 stores the received new routing map 12a in the storage unit 12, and deletes the old routing map 12a, thereby updating the routing map 12a. Thereafter, the processing unit 11 performs processing for relaying information between the in-vehicle networks NW1 to NW3 using the updated routing map 12a. Note that the processing unit 10 determines whether or not the communication unit that has received the routing map 12a is the fourth communication unit 24, and if the communication unit that has received the routing map 12a is not the fourth communication unit 24 but any one of the first to third communication units 21 to 23, the update with the received routing map 12a is not performed.

Figure 5:
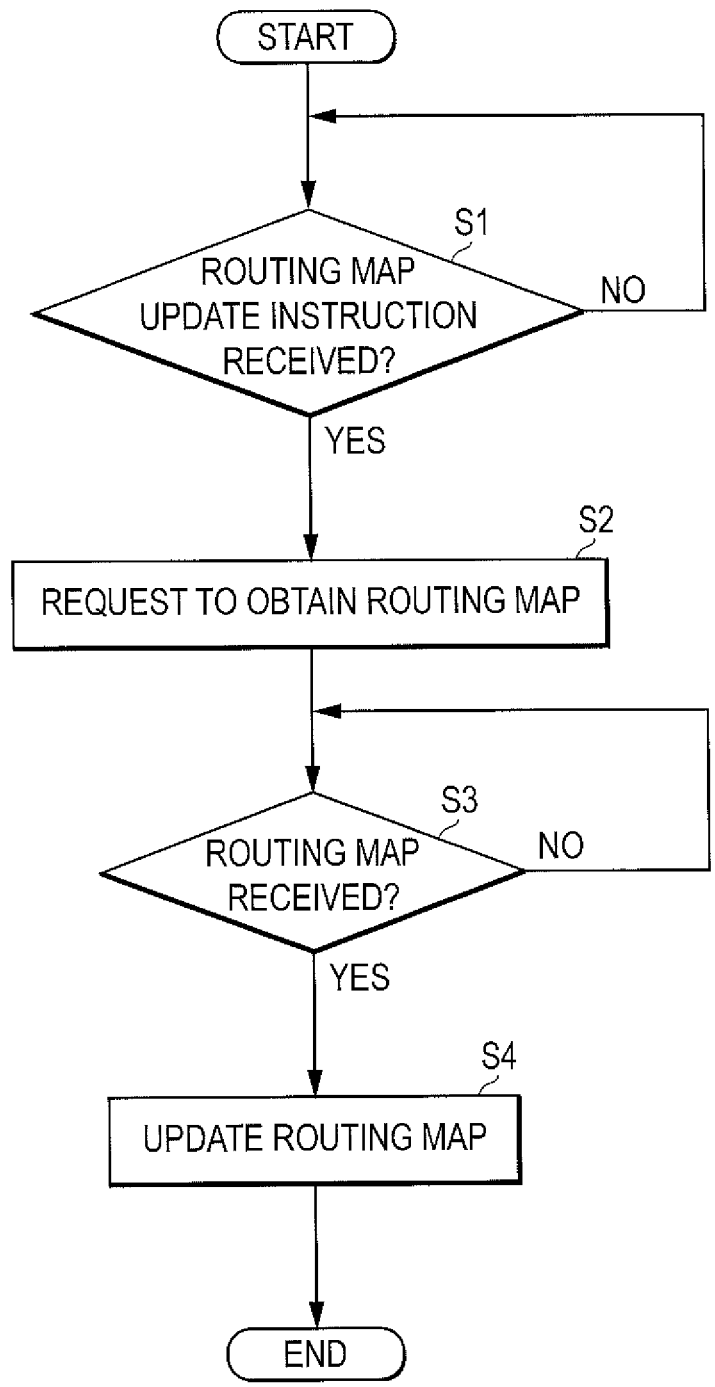
FIG. 5 is a flowchart illustrating procedures of routing map update processing performed by the gateway.

FIG. 5 is a flowchart illustrating a procedure of the processing for updating the routing map 12a performed by the gateway 10. The processing unit 11 of the gateway 10 determines whether or not an instruction to update the routing map 12a has been received by the operation unit, the operation device, or the like (step S1). If no update instruction has been received (No, in step S1), the processing unit 11 stands by until the update instruction is received. If an update instruction has been received (Yes, in step S1), the processing unit 11 requests, using the fourth communication unit 24, the security controller 30 to acquire a routing map 12a (step S2).

Then, the processing unit 11 determines whether or not the fourth communication unit 24 has received a new routing map 12a from the security controller 30 (step S3). If no routing map 12a has been received (No, in step S3), the processing unit 11 stands by until a routing map 12a is received. If a routing map 12a has been received (Yes, in step S3), the processing unit 11 stores the received new routing map 12a in the storage unit 12 and deletes the old routing map 12a (step S4), thereby updating the routing map 12a, and the procedure ends.

Figure 6:
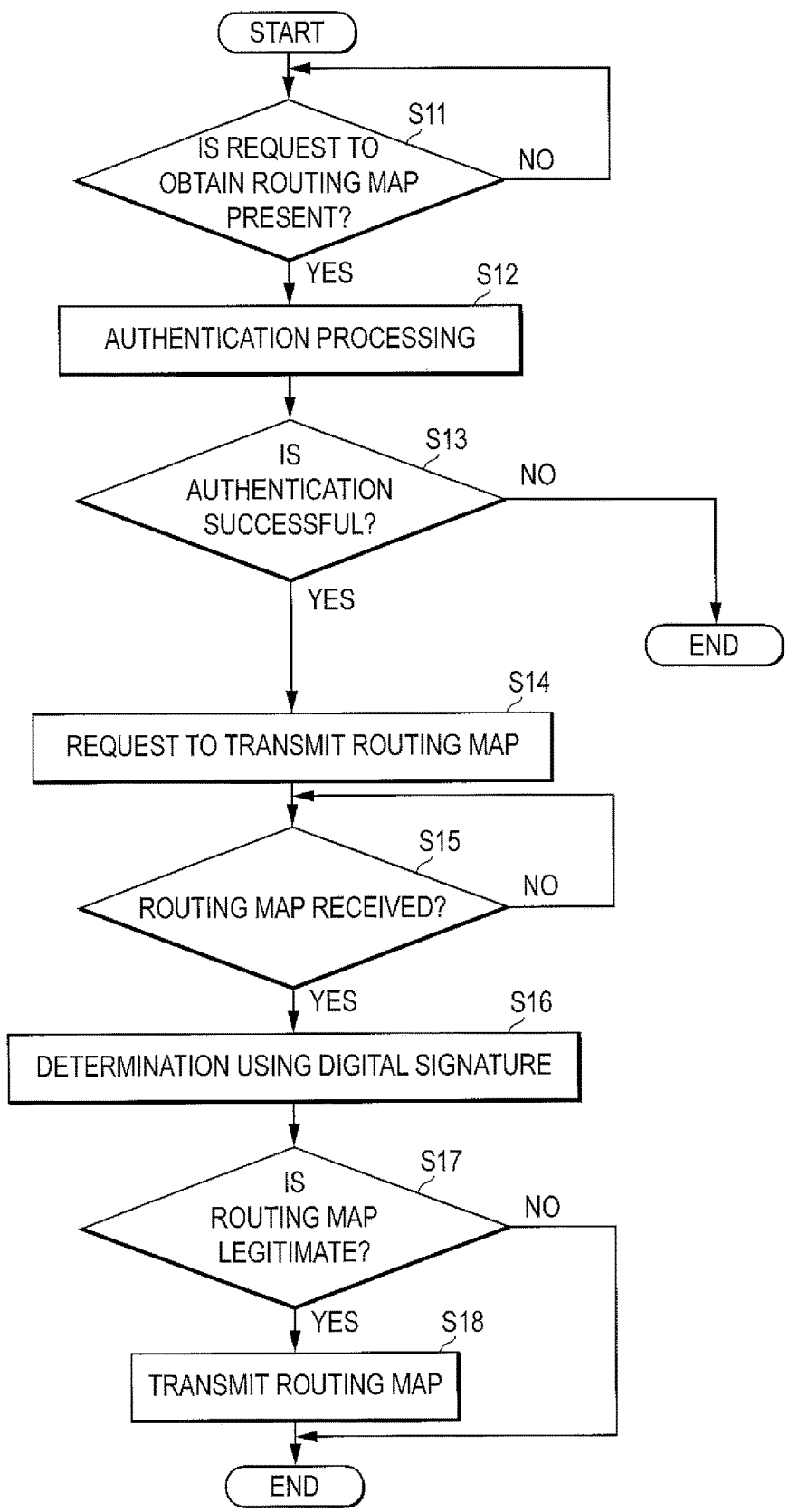
FIG. 6 is a flowchart illustrating procedures of routing map update processing performed by the security controller.

FIG. 6 is a flowchart illustrating a procedure of the processing for updating the routing map 12a performed by the security controller 30. The processing unit 31 of the security controller 30 performs processing for updating the routing map 12a by executing the update processing program 31a. The processing unit 31 determines whether or not a request to acquire a routing map 12a has been received from the gateway 10 at the vehicle internal communication unit 35 (step S11). If no request to acquire a routing map 12a has been received (No, in step S11), the processing unit 31 stands by until a request to acquire a routing map 12a is received.

If a request to acquire a routing map 12a has been received (Yes, in step S11), the processing unit 31 starts communicating with the server device 9, and performs authentication processing using the authentication information 36b stored in the storage unit 36 (step S12). The processing unit 31 determines whether or not the authentication processing was successful (step S13), and if the authentication processing has failed (No, in step S13), the update processing ends. Note that, at that time, the processing unit 31 may notify the gateway 10 of the failure of the update processing, and the gateway 10 may interrupt the processing for updating the routing map 12a in response to this notification.

If the authentication processing was successful (Yes, in step S13), the processing unit 31 requests the server device 9 to transmit a routing map 12a (step S14). Then, the processing unit 31 determines whether or not the wireless communication unit 34 has received a routing map 12a from the server device 9 (step S15). If no routing map 12a has been received (No, in step S15), the processing unit 31 stands by until a routing map 12a is received from the server device 9. If a routing map 12a has been received (Yes, in step S15), the processing unit 31 decrypts the encrypted routing map 12a using the key information included in the authentication information 36b, performs a determination based on the digital signature included in the routing map 12a (step S16), and determines whether or not this routing map 12a is a legitimate one (step S17). If the routing map 12a is not a legitimate one (No, in step S17), the processing unit 31 ends the update processing. If the routing map 12a is a legitimate one (Yes, in step S17), the processing unit 31 lets the vehicle internal communication unit 35 transmit this routing map 12a to the gateway 10 (step S18), and the procedure ends.

In the in-vehicle communication system having such a configuration according to the present embodiment, the gateway 10 that relays information between the multiple in-vehicle networks NW1 to NW3 has stored, in the storage unit 12, the routing map 12a that is necessary for determining a relay destination of the information. The routing map 12a may be, for example, a table in which IDs given to information to be relayed and IDs given to the in-vehicle networks NW1 to NW3 are associated with each other. The gateway 10 performs relay processing between the in-vehicle networks NW1 to NW3 based on the stored routing map 12a.

If a new ECU 58 is connected to the in-vehicle network NW1, the security controller 30 obtains a new routing map 12a by communicating with the server device 9, determines whether or not the obtained routing map 12a is a legitimate one based on digital signature information or the like, and then updates the routing map 12a stored in the storage unit 12 of the gateway 10. Accordingly, it is possible to make the update of the routing map 12a of the gateway 10 difficult if an improper ECU is connected to any one of the in-vehicle networks NW1 to NW3. Therefore, it is possible to prevent the connection of the improper ECU from adversely affecting other in-vehicle networks NW1 to NW3 than the in-vehicle network to which the improper ECU is connected.

Furthermore, if, as a result of the determination of a relay destination based on the routing map 12a stored in the storage unit 12, there is no relay destination of the information, the gateway 10 gives out a notification. With this, it is possible to notify for example the dealer or the owner of the vehicle 1 of the connection of the improper ECU.

Furthermore, the security controller 30 obtains a routing map 12a by communicating with the external server device 9, and determines whether or not the obtained routing map 12a is a legitimate one. The gateway 10 communicates with the security controller 30, and updates the routing map 12a using the information provided from the security controller 30. At that time, the gateway 10 performs the update processing if the routing map 12a has been received by the fourth communication unit 24, and is restricted so as not to perform the update processing if the routing map 12a has been received by any of the first to third communication units 21 to 23. Accordingly, it is possible to prevent a device other than the security controller 30 from improperly updating the routing map 12a in the gateway 10.

Note that, although the present embodiment has a configuration in which an operator who added the ECU 58 gives the gateway 10 an instruction to update the routing map 12a, the present disclosure is not limited to this configuration. For example, the operator may also give the update instruction to the security controller 30 or the ECU 58. Furthermore, although the present embodiment has a configuration in which the communication unit that receives a routing map 12a is limited to the fourth communication unit 24, this limitation is not essential. Furthermore, although the network configuration of the in-vehicle communication system, the number of ECUs 51 to 57, and the like that are shown in FIG. 1 are taken as examples, the present disclosure is not limited to those examples. Furthermore, as a predetermined condition for determining whether or not to perform an update using a received routing map 12a, it is determined whether or not the received routing map 12a is legitimate information based on digital signature information, but the present disclosure is not limited to this. The security controller 30 may determine whether or not the received information is legitimate information by other various types of methods, and may also define, as the predetermined condition for the determination, a condition other than the determination of whether or not the received information is legitimate information.

Furthermore, the security controller 30 may also acquire, with a position information acquiring unit 33, position information of the vehicle 1 when performing the processing for updating the routing map 12a. The security controller 30 may be configured to perform the processing for updating the routing map 12a only when the position of the vehicle 1 is within a predetermined position range registered in advance, and not to perform the processing for updating the routing map 12a when the position is not within the predetermined position range.

Modified Example

Figure 7:
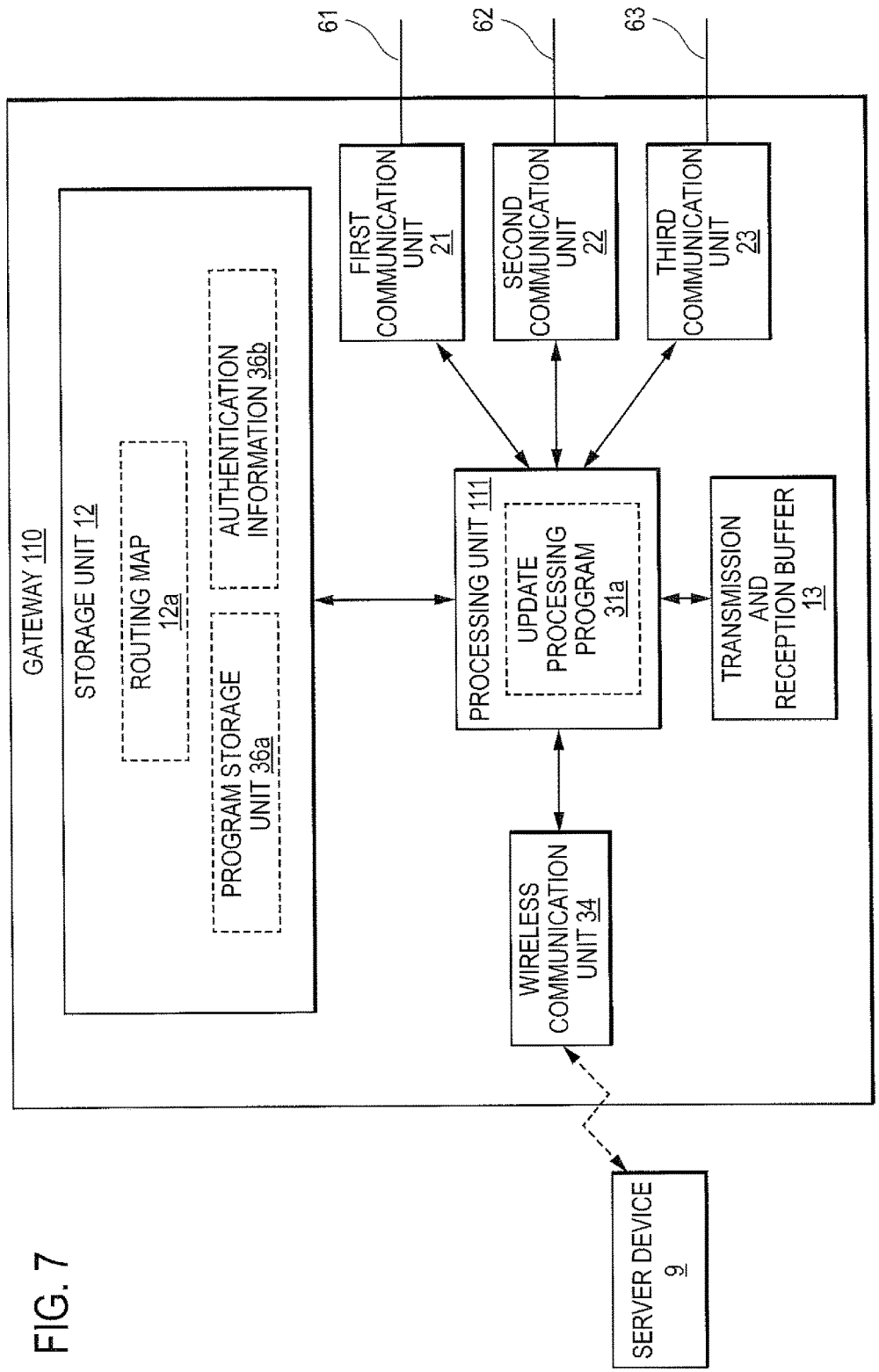
FIG. 7 is a block diagram illustrating a configuration of a gateway according to a modified example.

The above-described in-vehicle communication system according to Embodiment 1 has the configuration in which the gateway 10 and the security controller 30 are provided as separate devices in the vehicle 1. In contrast, an in-vehicle communication system according to a modified example has a configuration in which a gateway 110 has the function of the security controller 30 as well (in other words, the security controller 30 has the function of the gateway 10 as well). FIG. 7 is a block diagram illustrating a configuration of the gateway 110 according to the modified example. The gateway 110 according to the modified example includes the wireless communication unit 34 that performs wireless communication with the server device 9.

Also, in the gateway 110 according to the modified example, the storage unit 12 includes the program storage unit 36a in which a program such as the update processing program 31a is stored. Furthermore, the authentication information 36b with which authentication processing with the server device 9 is performed is stored in the storage unit 12. The processing unit 111 of the gateway 110 can obtain a routing map 12a from the server device 9 by executing the update processing program 31a read from the storage unit 12, and can perform update processing.

Embodiment 2

Figure 8:
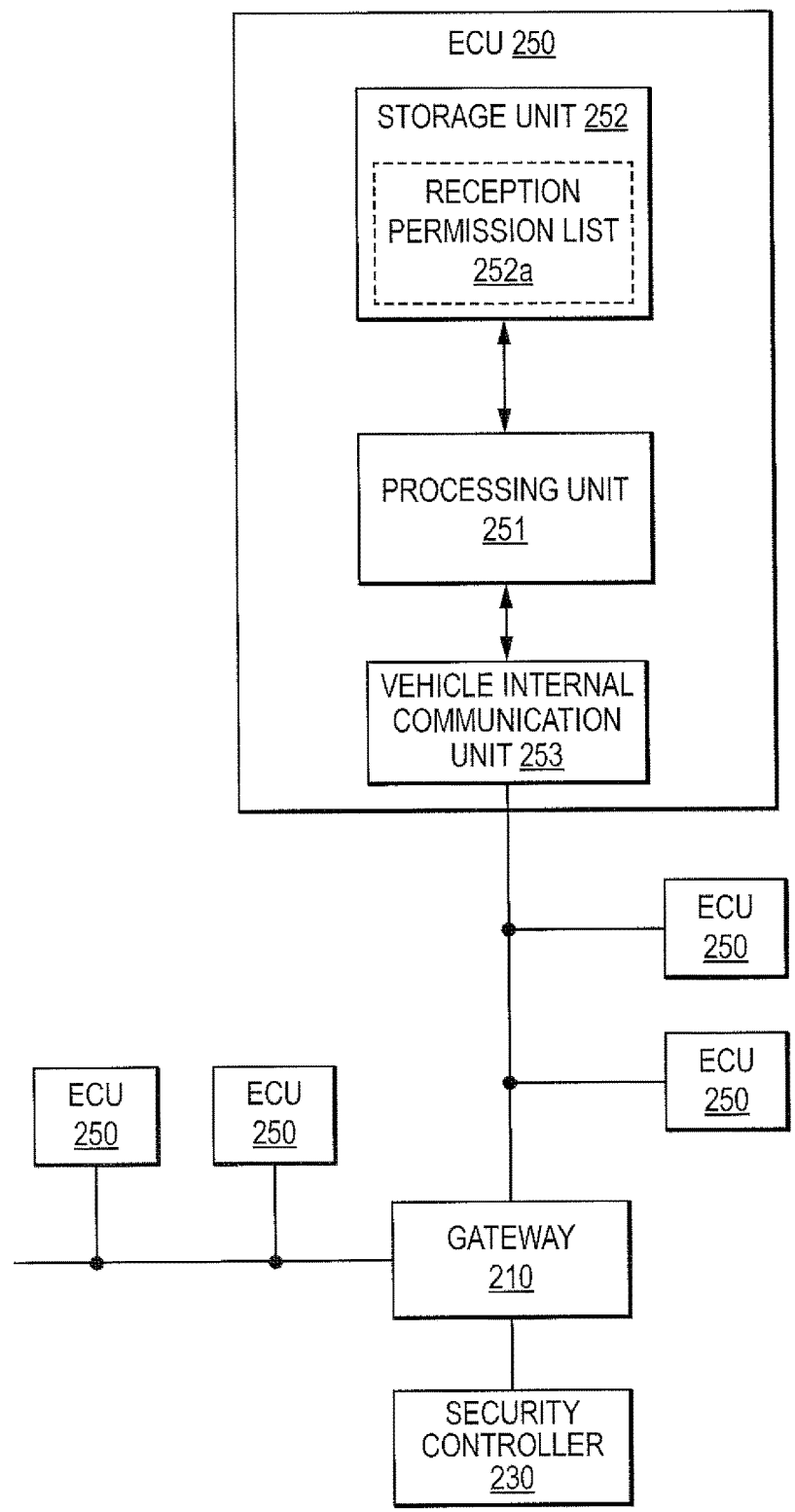
FIG. 8 is a schematic diagram illustrating a configuration of an in-vehicle communication system according to another embodiment.

FIG. 8 is a schematic diagram illustrating a configuration of an in-vehicle communication system according to Embodiment 2. Note that, in FIG. 8, a detailed configuration of one ECU 250 is shown, and detailed configurations of other ECUs 250 are omitted since they may have the same configuration. Each ECU 250 according to Embodiment 2 includes a processing unit 251, a storage unit 252, a vehicle internal communication unit 253, and the like. The processing unit 251 is constituted by an arithmetic processing unit such as a CPU or an MPU, and performs various types of processing such as control processing on the vehicle 1. The storage unit 252 is constituted by a data rewritable non-volatile memory element, such as an EEPROM or a flash memory. The storage unit 252 has stored therein a reception permission list 252a, which is a list of IDs given to information that are permitted to be received by this ECU 250. The vehicle internal communication unit 253 is connected to a communication line constituting an in-vehicle network, and performs information transmission and reception complying with, for example, the CAN communication standard. The vehicle internal communication unit 253 receives information transmitted by another device in the in-vehicle network by monitoring signals on the communication line, and provides the received information to the processing unit 251. Also, the vehicle internal communication unit 253 transmits information for transmission that was provided by the processing unit 251 to another device in the in-vehicle network by outputting the information to the communication line as a signal.

The ECU 250 according to Embodiment 2 performs processing for restricting information to be received based on the reception permission list 252a stored in the storage unit 252. The vehicle internal communication unit 253 of the ECU 250 monitors the signals on the communication line and, if having detected information transmitted from another device, the vehicle internal communication unit 253 checks the ID of this information and notifies the processing unit 251 of the ID. The processing unit 251 determines whether or not the ID of the received information that was notified by the vehicle internal communication unit 253 is the ID registered in the reception permission list 252a of the storage unit 252. If the ID of the received information is not registered in the reception permission list 252a, the processing unit 251 does not perform the processing using this received information. Alternatively, the processing unit 251 may interrupt the information reception itself of the vehicle internal communication unit 253 and put a restriction in place so as to prevent the vehicle internal communication unit 253 from receiving information whose ID is not registered in the reception permission list 252a.

Next, it is discussed how to add a new ECU 250 to the in-vehicle network. In order that information transmitted from a newly added ECU 250 is received and processed by another ECU 250, the ID of the information transmitted by the newly added ECU 250 needs to be registered in the reception permission list 252a of each ECU 250. Accordingly, in the in-vehicle communication system according to Embodiment 2, the reception permission list 252a of each ECU 250 is updated when the routing map 12a of the gateway 210 is updated.

An operator who has undertaken the task of adding a new ECU 250 to the in-vehicle network gives the gateway 210 an instruction to update the routing map 12a and the reception permission lists 252a using, for example, an operation unit, an operation device, or the like. The gateway 210 that has received this update instruction requests the security controller 230 to obtain a new routing map 12a and new reception permission lists 252a. In response to the request from the gateway 210, the security controller 230 starts communicating with the server device 9 that will provide a routing map 12a and reception permission lists 252a. The security controller 230 performs authentication processing with the server device 9 using the authentication information 36b and, if the authentication processing was successful, the security controller 230 then requests the server device 9 to transmit a new routing map 12a and reception permission lists 252a.

In response to the request from the security controller 230, the server device 9 transmits an appropriate routing map 12a and appropriate reception permission lists 252a to the source that has transmitted this request. At that time, the server device 9 may create new reception permission lists 252a based on the information provided together with the request from the security controller 230 and transmit the created reception permission lists 252a, or may select appropriate ones from among reception permission lists 252a stored in advance and transmit the selected reception permission lists 252a. The server device 9 transmits, to the security controller 230, the reception permission lists 252a for the respective ECUs 250 installed in the vehicle 1.

The security controller 230 that has received the routing map 12a and the reception permission lists 252a from the server device 9 decrypts the encrypted information based on key information included in the authentication information 36b, and determines, based on information added to the information, such as digital signatures, whether or not the information is legitimate information. If it is determined that the information is legitimate information, the security controller 230 transmits the routing map 12a and the reception permission lists 252a to the gateway 210.

The gateway 210 that has received the routing map 12a and the reception permission list 252a from the security controller 230 updates the routing map 12a stored in the storage unit 12 with the received new routing map 12a. Furthermore, the gateway 210 transmits the received new reception permission lists 252a to the respective ECUs 250.

Each ECU 250 that has received the reception permission list 252a from the gateway 210 stores the received reception permission list 252a in the storage unit 252, and deletes the old reception permission list 252a, thereby updating the reception permission list 252a. Note that since the reception permission lists 252a of the ECUs 250 differ from each other, each ECU 250 can distinguish its own reception permission list 252a from the reception permission lists 252a of other ECUs 250. For example, each reception permission list 252a includes the ID of the corresponding ECU 250, and each ECU 250 can determine whether or not the received reception permission list 252a is for use in updating of its own reception permission list 252a, depending on whether or not the ID given to the received reception permission list 252a corresponds to own ID.

In the in-vehicle communication system according to Embodiment 2 having such a configuration, for information to be transmitted and received in an in-vehicle network, each ECU 250 has stored, in its storage unit 252, a reception permission list 252a necessary for determining whether or not the information is to be received. The reception permission list 252a is, for example, a list of IDs given to information to be received, or the like. Each ECU 250 receives information that was determined to be received based on the reception permission list 252a, and processes this information, but does not process other information.

Since, if a new ECU 250 is connected to the in-vehicle network, the other ECUs 250 determine whether or not information transmitted by the new ECU 250 is to be received, the reception permission list 252a stored in each ECU 250 needs to be updated. In the in-vehicle communication system according to Embodiment 2, the security controller 230 obtains reception permission lists 252a by communicating with the server device 9, as with the case of the routing map 12a of the gateway 210, determines whether or not the obtained information is legitimate, and then updates the reception permission lists 252a stored in the storage units 252 of the ECUs 250. With this, even if an improper ECU 250 is connected to the in-vehicle network, it is possible to prevent another ECU 250 from receiving information transmitted by the improper ECU 250 and processing the received information.

Note that the present embodiment has a configuration in which the server device 9 transmits the reception permission lists 252a of the respective ECUs 250, but the present disclosure is not limited to this. For example, a configuration is also possible in which the server device 9 transmits information for creating reception permission lists 252a, and the security controller 230 or the gateway 210 creates, based on this information, the reception permission lists 252a of the respective ECUs 250.

Furthermore, other configurations of the in-vehicle communication system according to Embodiment 2 are the same as those of the in-vehicle communication system according to Embodiment 1, and therefore the same reference numerals are added to the same components and detailed descriptions thereof are omitted.

What is claimed is:

1. An in-vehicle communication system comprising:
a plurality of in-vehicle networks respectively connected to at least one in-vehicle device; and
an in-vehicle relay apparatus that is connected to the plurality of in-vehicle networks and that relays information between the in-vehicle networks, the in-vehicle relay apparatus comprising:
a first memory that stores relay destination determination information that is necessary to determine a destination of information to be relayed by the in-vehicle relay apparatus, and
a first processor that determines, based on the relay destination determination information stored in the first memory, another said in-vehicle network to which received information is to be transmitted if the received information is received from one said in-vehicle network, the in-vehicle communication system further comprising:
an external communicator that transmits and receives information to and from a communication device outside of a vehicle; and
a second processor that (i) acquires, using the external communicator, updated relay destination determination information from the communication device outside of the vehicle, and (ii) performs authentication processing to determine if the acquired updated relay destination determination information is legitimate by comparing the updated relay destination determination information to a predetermined condition, wherein:
if the second processor has determined that the updated relay destination determination information satisfies the predetermined condition, the first processor updates the relay destination determination information previously stored in the first memory of the in-vehicle relay apparatus by storing the updated relay destination determination information in the first memory and deleting the previously stored relay destination determination information, and
the updated relay destination determination information is used to determine the destination of the information to be relayed by the in-vehicle relay apparatus.

2. The in-vehicle communication system according to claim 1,
wherein the in-vehicle relay apparatus is configured to give out a notification if there is no said in-vehicle network to which the received information is to be relayed.

3. The in-vehicle communication system according to claim 1,
wherein each of the in-vehicle devices connected to the in-vehicle networks comprises:
a second memory that stores reception determination information that is necessary to determine if information is to be received; and
a third processor that (i) determines, based on the stored reception determination information, if information transmitted from the in-vehicle relay apparatus is to be received, and (ii) puts a restriction to prevent processing using the information transmitted from the in-vehicle relay apparatus if it is determined that the information transmitted from the in-vehicle relay apparatus is not to be received,
wherein the second processor (iii) acquires, using the external communicator, updated reception determination information for each of the in-vehicle devices from the communication device outside of the vehicle, and (iv) determines if the acquired updated reception determination information satisfies a predetermined condition, and
wherein the third processor updates the reception determination information stored in the second memory of each of the in-vehicle devices with the updated reception determination information if the second processor has determined that the updated reception determination information satisfies the predetermined condition.

4. The in-vehicle communication system according to claim 1, further comprising:
an information updating apparatus that includes the external communicator and the second processor,
wherein the first processor is configured to update the relay destination determination information previously stored in the first memory of the in-vehicle relay apparatus with information provided from the information updating apparatus.

5. The in-vehicle communication system according to claim 4,
wherein the in-vehicle relay apparatus further comprises:
a plurality of vehicle internal communicators that respectively transmit and receive information to and from the plurality of in-vehicle networks; and
an update communicator that transmits and receives information to and from the information updating apparatus, and
wherein reception of information used to update the relay destination determination information previously stored in the first memory is restricted to the update communicator.

6. The in-vehicle communication system according to claim 1,
wherein the second processor is configured to determine, as the predetermined condition, if the acquired updated relay destination determination information is legitimate information based on (1) a result of authentication processing performed with the communication device outside of the vehicle, or (2) digital signature information added to the acquired information.

7. The in-vehicle communication system according to claim 1,
wherein the relay destination determination information associates an identification of the information to be relayed by the in-vehicle relay apparatus with at least one of the in-vehicle networks.

8. The in-vehicle communication system according to claim 7,
wherein if the identification of the information to be relayed by the in-vehicle relay apparatus is not contained within the relay destination determination information, the in-vehicle relay apparatus sends a notification to an external device.

9. The in-vehicle communication system according to claim 1,
wherein the second processor is configured to transmit the updated relay destination determination information to the first processor, and
wherein if the first processor receives the updated relay destination determination information from a source other than the second processor, the first processor does not update the relay destination determination information previously stored in the first memory.

10. The in-vehicle communication system according to claim 1, wherein the updated relay destination determination information is a table that serves as a routing map for the in-vehicle relay apparatus.

11. An in-vehicle relay apparatus that is connected to a plurality of in-vehicle networks respectively connected to at least one in-vehicle device and that relays information between the in-vehicle networks, the in-vehicle relay apparatus comprising:
a memory that stores relay destination determination information that is necessary to determine a destination of information to be relayed by the in-vehicle relay apparatus;
a first processor that determines, based on the relay destination determination information stored in the memory, another said in-vehicle network to which received information is to be transmitted if the received information is received from one said in-vehicle network;
an external communicator that transmits and receives information to and from a communication device outside of a vehicle;
a second processor that (i) acquires, using the external communicator, updated relay destination determination information from the communication device outside of the vehicle, and (ii) performs authentication processing to determine if the acquired updated relay destination determination information is legitimate by comparing the updated relay destination determination information to a predetermined condition, wherein:
if the second processor has determined that the updated relay destination determination information satisfies the predetermined condition, the first processor updates the relay destination determination information previously stored in the memory of the in-vehicle relay apparatus by storing the updated relay destination determination information in the memory and deleting the previously stored relay destination determination information, and
the updated relay destination determination information is used to determine the destination of the information to be relayed by the in-vehicle relay apparatus.

12. The in-vehicle relay apparatus according to claim 11, wherein the updated relay destination determination information is a table that serves as a routing map for the in-vehicle relay apparatus.

13. An in-vehicle communication system comprising:
a plurality of in-vehicle networks respectively connected to at least one in-vehicle device; and
an in-vehicle relay means for connecting to the plurality of in-vehicle networks and for relaying information between the in-vehicle networks, the in-vehicle relay means comprising:
a storage means for storing relay destination determination information that is necessary to determine a destination of information to be relayed by the in-vehicle relay means, and
a relay destination determination means for determining, based on the relay destination determination information stored in the storage means, another said in-vehicle network to which received information is to be transmitted if the received information is received from one said in-vehicle network, the in-vehicle communication system further comprising:
a vehicle external communication means for transmitting and receiving information to and from a communication device outside of a vehicle;
an acquiring means for acquiring, using the vehicle external communication means, updated relay destination determination information from the communication device outside of the vehicle;
a determination means for performing authentication processing to determine if the updated relay destination determination information acquired by the acquiring means is legitimate by comparing the updated relay destination determination information to a predetermined condition; and
an update means for updating, if the determination means has determined that the updated relay destination determination information satisfies the predetermined condition, the relay destination determination information previously stored in the storage means of the in-vehicle relay means by storing the updated relay destination determination information in the storage means and deleting the previously stored relay destination determination information, wherein the updated relay destination determination information is used to determine the destination of the information to be relayed by the in-vehicle relay means.

14. The in-vehicle communication system according to claim 13, wherein the updated relay destination determination information is a table that serves as a routing map for the in-vehicle relay means.

* * * * *